United States Patent
Shen et al.

(10) Patent No.: US 8,583,050 B2
(45) Date of Patent: Nov. 12, 2013

(54) BUILDING INFLUENCE ESTIMATION APPARATUS AND BUILDING INFLUENCE ESTIMATION METHOD

(75) Inventors: Jiyun Shen, Yokosuka (JP); Yasuhiro Oda, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 430 days.

(21) Appl. No.: 12/784,937

(22) Filed: May 21, 2010

(65) Prior Publication Data
US 2010/0323628 A1    Dec. 23, 2010

(30) Foreign Application Priority Data
Jun. 16, 2009 (JP) ................................. 2009-143216

(51) Int. Cl.
*H04B 17/00* (2006.01)

(52) U.S. Cl.
USPC .................. 455/67.11; 455/440; 455/456.1

(58) Field of Classification Search
USPC ............ 455/67.11, 440, 456.1, 456.3, 550.1, 455/556.1
See application file for complete search history.

(56) References Cited

U.S. PATENT DOCUMENTS

| | | | |
|---|---|---|---|
| 7,328,019 B2 * | 2/2008 | Nishikawa et al. | 455/436 |
| 7,573,418 B2 * | 8/2009 | Kawai et al. | 342/42 |
| 8,099,106 B2 * | 1/2012 | Soliman et al. | 455/456.3 |
| 2007/0049295 A1 | 3/2007 | Soliman et al. | |
| 2009/0291641 A1 | 11/2009 | Sato et al. | |

FOREIGN PATENT DOCUMENTS

| | | |
|---|---|---|
| CN | 101292563 A | 10/2008 |
| JP | 10-51840 | 2/1998 |
| JP | 2003-283509 | 10/2003 |
| JP | 2005-318308 | 11/2005 |
| JP | 2007-532026 | 11/2007 |
| JP | 2009-111963 | 5/2009 |

OTHER PUBLICATIONS

European Office Action issued Feb. 29, 2012 in patent application No. 10 161 752.0.
Japanese Office Action issued Feb. 28, 2012 in patent application No. 2009-143216 with English translation.
Office Action issued May 9, 2012, in Chinese Patent Application No. 201010205207.4 with English translation.

(Continued)

*Primary Examiner* — Tuan H Nguyen
(74) *Attorney, Agent, or Firm* — Oblon, Spivak, McClelland, Maier & Neustadt, L.L.P.

(57) ABSTRACT

Appropriate and easy estimation is achieved for influence of a building on a mobile communication terminal. A building influence estimation apparatus 10 to estimate influence of a building on a mobile communication terminal 20 has: a reception information acquiring unit 12 which acquires reception information indicative of a reception intensity of a radio wave received by the mobile communication terminal 20 from a base station 30 and indicative of the base station 30; a location information acquiring unit 13 which acquires location information indicative of a location where the radio wave was received; a reception intensity estimating unit 14 which estimates a reception intensity of the radio wave according to the location indicated by the location information; a comparing unit 15 which makes a comparison between the estimated reception intensity and the reception intensity of the radio wave indicated by the reception information; a building influence estimating unit 16 which estimates influence of the building, based on the result of the comparison; and an outputting unit 17 which outputs information indicative of the estimated influence of the building.

7 Claims, 6 Drawing Sheets

(56) References Cited

OTHER PUBLICATIONS

Hiroyuki Shimizu, et al. "LOS and NLOS Path-Loss and Delay Characteristics at 3.35 GHz in a Residential Environment," IEEE Antennas and Propagation Society International Symposium, vol. 2, 2000. pp. 1142-1145.

Masaharu Hata. "Empirical Formula for Propagation Loss in Land Mobile Radio Services," IEEE Transactions on Vehicular Technology, vol. VT-29, No. 3, Aug. 1980. pp. 317-325.

Office Action issued Aug. 2, 2011 in Japan Application No. 2009-143216 (With English Translation).

Extended Search Report issued Aug. 5, 2011 in Europe Application No. 10161752.0.

Chinese Office Action Issued Nov. 30, 2012 in Patent Application No. 201010205207.4 (with English translation).

\* cited by examiner

EVALUATION CIRCLE

BUILDING INFLUENCE ESTIMATION APPARATUS AND BUILDING INFLUENCE ESTIMATION METHOD

BACKGROUND OF THE INVENTION

1. Field of the Invention

The present invention relates to a building influence estimation apparatus and a building influence estimation method for estimating influence of a building on a mobile communication terminal.

2. Related Background Art

Conventionally, estimation of influence of a building on a mobile communication terminal is carried out for purposes such as evaluation of reception intensity of radio waves at the mobile communication terminal. The estimation of the influence of the building on the mobile communication terminal is, for example, determination of a building entry loss (attenuation of a radio wave due to the building) or an indoor/outdoor decision to decide whether the mobile communication terminal is located inside the building.

One of such technologies is a method of transmitting radio waves from a communication device into respective directions and detecting reflected waves from an obstacle. In this method, the reflected waves from four directions are detected and if an obstacle is detected from the four directions, it is determined that the device is located indoors (e.g., cf. Japanese Patent Application Laid-open No. 2003-283509 (Patent Document 1)). There is another method of detecting NLOS (Non-Line-Of-Sight) from delay profiles of received waves, at the mobile communication terminal (e.g., cf. H. Shimizu, H. Masui, M. Ishii, and K. Sakawa, "LOS and NLOS path-loss and delay characteristics at 3.35 GHz in a residential environment," IEEE Antennas and Propagation Society International Symposium, 2000, pp. 1142-1145 vol. 2 (Non-patent Document 1)). There is a further proposal of a method of obtaining the electric field intensity in a building by calculation (e.g., cf. Japanese Patent Application Laid-open No. 2005-318308 (Patent Document 2)).

SUMMARY OF THE INVENTION

However, the above-described conventional technologies have their respective problems. The method of detecting the reflected waves requires special antennas and detector. In addition, in the indoor case, distances to the obstacle (wall) are about several ten meters at a maximum and thus arrival times of the reflected waves are short (several nm), which makes detection difficult. It is also impossible to estimate a building entry loss by this method. When the method of detecting NLOS is applied, for example, to a place where buildings are congested like an urban area, most are NLOS even outdoors and it is thus extremely difficult to detect an indoor situation from the result of the NLOS detection. It is also impossible to estimate the building entry loss by this method. The method of determining the electric field intensity in the building by calculation requires retention of data of the shape of the building and also requires complicated calculation.

The present invention has been accomplished in order to solve the above problems and it is therefore an object of the present invention to provide a building influence estimation apparatus and a building influence estimation method capable of achieving appropriate and easy estimation of influence of a building on a mobile communication terminal.

In order to achieve the above object, a building influence estimation apparatus according to the present invention is a building influence estimation apparatus for estimating influence of a building on a mobile communication terminal, comprising: reception information acquiring unit which acquires reception information indicative of a reception intensity of a radio wave received by the mobile communication terminal from at least one radio wave transmitter and indicative of the transmitter; location information acquiring unit which acquires location information indicative of a location where the mobile communication terminal received the radio wave; reception intensity estimating unit which estimates a reception intensity of a radio wave from the transmitter indicated by the reception information received by the reception information acquiring unit, according to the location indicated by the location information acquired by the location information acquiring unit; comparing unit which makes a comparison between the reception intensity estimated by the reception intensity estimating unit and the reception intensity of the radio wave indicated by the reception information acquired by the reception information acquiring unit; building influence estimating unit which estimates influence of the building on the mobile communication terminal, based on a result of the comparison by the comparing unit; and outputting unit which outputs information indicative of the influence of the building estimated by the building influence estimating unit.

The building influence estimation apparatus according to the present invention is configured to estimate the influence of the building on the mobile communication terminal, based on the comparison between the measured reception intensity and the estimated (or calculated) reception intensity of the radio wave from the transmitter at the location of the mobile communication terminal. Therefore, there is no need for special devices for transmission and reception of the radio waves and no need for the information about the building such as the shape of the building and for the complicated calculation. Namely, the building influence estimation apparatus according to the present invention achieves the appropriate and easy estimation of the influence of the building on the mobile communication terminal.

The reception intensity estimating unit is preferably configured to estimate reception intensities of radio waves from the transmitter at a plurality of locations in a predetermined range based on the location indicated by the location information, and to estimate the reception intensity of the radio wave according to the location indicated by the location information, from the reception intensities at the plurality of locations. This configuration allows the apparatus to achieve more appropriate estimation of the influence of the building even if the accuracy of the location associated with the location information is not high.

The reception intensity estimating unit is preferably configured to define the predetermined range as a range according to a communication area of the transmitter or an estimation method of the location. This configuration permits the apparatus to set the estimation range of the reception intensity to an appropriate size, and as a result, it permits the apparatus to achieve appropriate estimation of the influence of the building.

The reception intensity estimating unit is preferably configured to calculate a statistical value from the reception intensities of the radio waves from the transmitter at the plurality of locations and to define the statistical value as the reception intensity of the radio wave according to the location indicated by the location information. Alternatively, the building influence estimation apparatus is preferably configured as follows: the reception intensity estimating unit calculates statistical values for respective transmitters from reception intensities of radio waves from the transmitters at the plurality of locations and defines the statistical values as reception intensities of the radio waves according to the location indicated by the location information, and the comparing unit makes a comparison between each of the reception intensities of the respective transmitters estimated by the reception intensity estimating unit and the reception intensity of the radio wave indicated by the information received by the reception information acquiring unit. These configurations allow the apparatus to achieve secure estimation of the influence of the building.

The location information acquiring unit is preferably configured to acquire the location information by estimating the location, based on the reception information acquired by the reception information acquiring unit. This configuration allows the building influence estimation apparatus to simply acquire at least the reception information on the occasion of the estimation of the influence of the building.

The building influence estimation apparatus is preferably configured as follows: the location information acquiring unit preliminarily stores reception intensities of radio waves received by the mobile communication terminal from the transmitter, according to locations, makes a comparison between the reception intensity associated with the reception information acquired by the reception information acquiring unit, and the stored reception intensities, and acquires the location information, based on a result of the comparison, and the reception intensity estimating unit estimates reception intensities of the radio waves from the transmitter at a plurality of locations based on the location indicated by the location information, and estimates the reception intensity of the radio wave according to the location indicated by the location information, from the reception intensities at the plurality of locations. This configuration permits the apparatus to achieve the estimation of the reception intensity of the radio wave with high accuracy.

The reception information acquiring unit is preferably configured to acquire information indicative of reception intensities of radio waves received at a plurality of different times by the mobile communication terminal and indicative of the transmitter, and to calculate the reception information from the information associated with the plurality of different times. This configuration permits the apparatus to eliminate variation in reception intensity due to fading or the like and as a result, it permits the apparatus to achieve appropriate estimation of the influence of the building.

The building influence estimating unit is preferably configured to estimate as the influence of the building, at least either of whether the mobile communication terminal is present in the building, and a building entry loss of the radio wave from the transmitter received by the mobile communication terminal. These configurations allow secure implementation of the present invention.

Incidentally, the present invention can be described as the invention of the building influence estimation apparatus as described above, and can also be described as the invention of a building influence estimation method as described below. This is different in category only but is substantially the same invention, with the same action and effect.

Namely, a building influence estimation method according to the present invention is a building influence estimation method for estimating influence of a building on a mobile communication terminal, comprising: a reception information acquiring step of acquiring reception information indicative of a reception intensity of a radio wave received by the mobile communication terminal from at least one radio wave transmitter, and indicative of the transmitter; a location information acquiring step of acquiring location information indicative of a location where the mobile communication terminal received the radio wave; a reception intensity estimating step of estimating a reception intensity of the radio wave from the transmitter indicated by the reception information received in the reception information acquiring step, according to the location indicated by the location information acquired in the location information acquiring step; a comparing step of making a comparison between the reception intensity estimated in the reception intensity estimating step and the reception intensity of the radio wave indicated by the reception information acquired in the reception information acquiring step; a building influence estimating step of estimating influence of the building on the mobile communication terminal, based on a result of the comparison in the comparing step; and an outputting step of outputting information indicative of the influence of the building estimated in the building influence estimating step.

The present invention achieves the estimation of the influence of the building, without need for the special devices for transmission and reception of radio waves and without need for the information about the building such as the shape of the building and for the complicated calculation. Namely, the present invention enables the appropriate and easy estimation of the influence of the building on the mobile communication terminal.

DESCRIPTION OF THE PREFERRED EMBODIMENTS

The preferred embodiments of the building influence estimation apparatus and the building influence estimation method according to the present invention will be described below in detail with the drawings. In the description of the drawings the same elements will be denoted by the same reference symbols, without redundant description.

Figure 1:
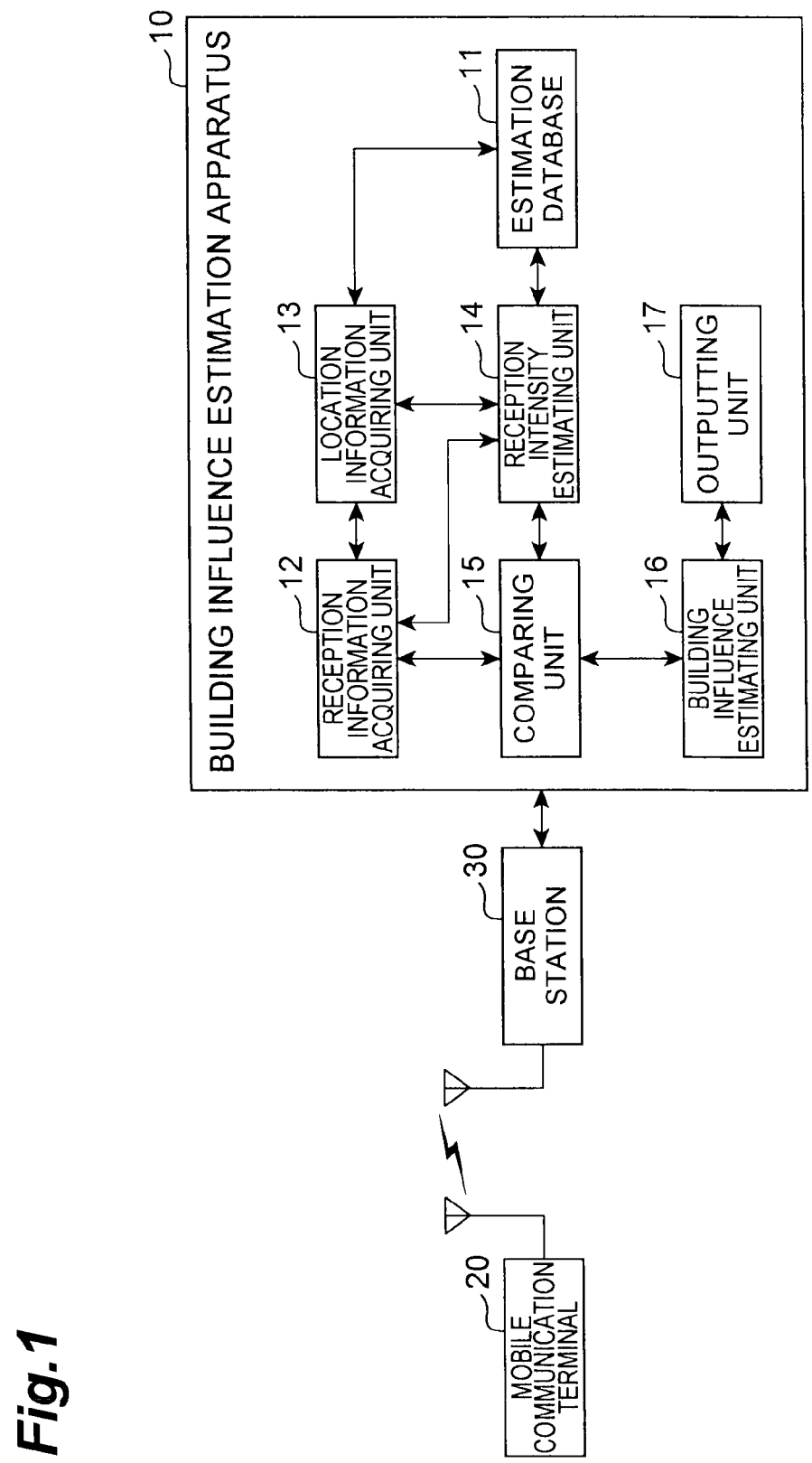
FIG. 1 is a drawing to show a functional configuration of a building influence estimation apparatus according to an embodiment of the present invention.

FIG. 1 shows a building influence estimation apparatus 10 according to the present embodiment. The building influence estimation apparatus 10 is a device to estimate influence of a building on a mobile communication terminal 20. To estimate influence of a building on the mobile communication terminal 20 is specifically, for example, to estimate a building entry loss of a radio wave reaching the mobile communication terminal 20 from a radio wave transmitter, or to decide whether the mobile communication terminal 20 is located inside a construction (an office building, a house, or the like).

The building entry loss is an attenuation of the radio wave reaching the mobile communication terminal 20 due to influence of the building in situations where the building is located between the mobile communication terminal 20 and the radio wave transmitter and, particularly, in a situation where the mobile communication terminal 20 is located inside or near the building. Information indicative of the estimated influence of the building is used, for example, in determining a positioning method of the mobile communication terminal 20.

The estimation of the influence of the building on the mobile communication terminal 20 by the building influence estimation apparatus 10 is carried out by making use of a framework of a mobile communication system (cellular communication system). The building influence estimation apparatus 10 is connected to a plurality of base stations 30 included in the mobile communication system and can communicate through a base station 30 with the mobile communication terminal 20. The building influence estimation apparatus 10 may be included in the mobile communication system. However, the building influence estimation apparatus 10 does not always have to transmit and receive information to and from the mobile communication terminal 20 through the base station 30 (or a mobile communication network), but it is sufficient that the building influence estimation apparatus 10 be configured to transmit and receive information to and from the mobile communication terminal 20 through any means. The building influence estimation apparatus 10 may be implemented as a function of a server that performs positioning (operation) of the mobile communication terminal 20.

The mobile communication terminal 20, specifically, corresponds, for example, to a cell phone and is used by a user subscribing to a telecommunications carrier providing the mobile communication system. The mobile communication terminal 20 has a function to carry out mobile communication (cellular communication) through wireless communication with a plurality of base stations 30 included in the mobile communication network (cellular communication network) of the mobile communication system. The mobile communication terminal 20 acquires information necessary for estimation of influence of the building, based on the function of mobile communication, and transmits the information to the building influence estimation apparatus 10. What specific type of information is acquired and transmitted will be described later. The mobile communication terminal 20 is configured with such hardware as a CPU (Central Processing Unit), memories, and a wireless communication module.

Each base station 30 is a constituent element in the mobile communication network and radio wave transmitter that transmits a radio wave for estimation of influence of the building, and is installed at a predetermined location. Information to uniquely identify a base station 30, e.g., a base station ID, location information of the base station, etc. is set for each base station 30 and the building influence estimation apparatus 10 and the mobile communication terminal 20 can identify the base station 30 on the basis of the information. There are cases where each base station 30 is sectorised and a plurality of sectors are set in respective directions of transmission of radio waves (the sectors can also be identified in the same manner as above).

The below will describe detailed functions of the building influence estimation apparatus 10. As shown in FIG. 1, the building influence estimation apparatus 10 is configured with an estimation database 11, a reception information acquiring unit 12, a location information acquiring unit 13, a reception intensity estimating unit 14, a comparing unit 15, a building influence estimating unit 16, and an outputting unit 17.

The estimation database 11 is a database that preliminarily stores information used in the estimation of influence of the building. The stored information is preliminarily entered by an administrator or the like of the building influence estimation apparatus 10. The estimation database 11, specifically, stores the information about each base station 30. The information about each base station 30 is information indicative of the location where each base station 30 is installed, information indicative of the intensity of the radio wave transmitted from each base station 30 (transmission intensity), and so on. The estimation database 11 may store other information necessary for the estimation (e.g., parameters used in calculation or the like).

The reception information acquiring unit 12 is a reception information acquiring unit that acquires reception information indicative of the reception intensity (signal intensity) of the radio wave received by the mobile communication terminal 20 from the base station 30 and indicative of the base station 30. The mobile communication terminal 20 acquires the reception intensity of the radio wave received from the base station 30, by measurement. The radio wave is, for example, a radio wave associated with a pilot signal (broadcast signal) periodically transmitted from the base station 30. Furthermore, the mobile communication terminal 20 acquires the information to identify the base station 30, e.g., the base station ID, from the signal and associates the information with the information indicative of the measured reception intensity to obtain the reception information. The reception information may contain a sector associated with the radio wave. The mobile communication terminal 20 transmits the reception information thus acquired, to the building influence estimation apparatus 10. The reception information acquiring unit 12 receives the reception information transmitted from the mobile communication terminal 20, thereby acquiring the reception information.

The reception information may contain information associated with radio waves received from a plurality of base stations 30. If the mobile communication terminal 20 is provided with a plurality of branches, reception intensities of radio waves from a plurality of base stations 30 can be measured by a single measurement. Furthermore, the reception information may contain information associated with radio waves received at a plurality of different times. In the case where the reception information received from the mobile communication terminal 20 contains the information of the reception intensities of the radio waves received at different times, the reception information acquiring unit 12 calculates a statistical value (e.g., a mean value or median value of the reception intensities at all the times) from the plurality of reception intensities for each base station 30 in the reception information, and defines the statistical value as the reception intensity to be used in the following processing. The reception information acquiring unit 12 outputs the acquired reception information to the reception intensity estimating unit 14 and the comparing unit 15. The reception information acquiring unit 12 outputs the acquired reception information to the location information acquiring unit 13 as occasion may demand.

The location information acquiring unit 13 is a location information acquiring unit that acquires location information indicative of a location where the mobile communication terminal 20 received the radio wave associated with the reception information. The location associated with the location information acquired herein does not always have to be a highly accurate one, but it may be an approximate location with low accuracy (e.g., with an error of about several ten meters to several hundred meters). The location information acquired herein is, for example, information indicative of location coordinates such as latitude and longitude. The location information acquiring unit 13 performs, for example, estimation (operation) of the location of the mobile communication terminal 20, based on the reception information received by the reception information acquiring unit 12, to acquire the location information. Specifically, the location of the mobile communication terminal 20 may be determined to be a coordinate location of a base station 30 with the highest reception intensity indicated by the reception information. The information indicative of the coordinate location of the base station 30 is acquired from the estimation database 11. The location of the mobile communication terminal 20 may also be determined to be a center coordinate location of a sector of a base station 30 with the highest reception intensity indicated by the reception information. The information indicative of the center coordinate location of the sector of the base station 30 is acquired from the estimation database 11.

The location information acquiring unit 13 may be configured to estimate the location of the mobile communication terminal 20 by any method other than the above methods. For example, base station positioning (operation) may be carried out. The base station positioning is, specifically, a process as described below. The location information acquiring unit 13 receives positioning information for base station positioning transmitted from the mobile communication terminal 20 to the building influence estimation apparatus 10. The positioning information for base station positioning is transmitted in association with the aforementioned reception information to the building influence estimation apparatus 10. The positioning information for base station positioning is, for example, information indicative of a transmission delay of a radio wave (e.g., RTT: Round Trip Time) transmitted and received between the mobile communication terminal 20 and the base station 30 or indicative of an attenuation of the radio wave (or, possibly, information measured for calculation of those types of information), which is measured and acquired by the mobile communication terminal 20, and information to identify the base station 30 or sector (base station ID or sector ID). The location information acquiring unit 13 calculates a distance between the mobile communication terminal 20 and the base station 30, based on the foregoing information such as the transmission delay of the radio wave, and figures out the location of the mobile communication terminal 20, with reference to the location information or the like of the base stations 30 stored in the estimation database 11.

Furthermore, the location information acquiring unit 13 may be configured to receive and acquire the location information from the mobile communication terminal 20, instead of estimating the location of the mobile communication terminal 20. In that case, the mobile communication terminal 20 has a function to perform positioning of the terminal itself, and transmits the location information in association with the reception information to the building influence estimation apparatus 10. The location information acquiring unit 13 may also be configured to receive the location information of the mobile communication terminal 20 from any device other than the mobile communication terminal 20. The location information acquiring unit 13 outputs the acquired location information to the reception intensity estimating unit 14.

Figure 2:
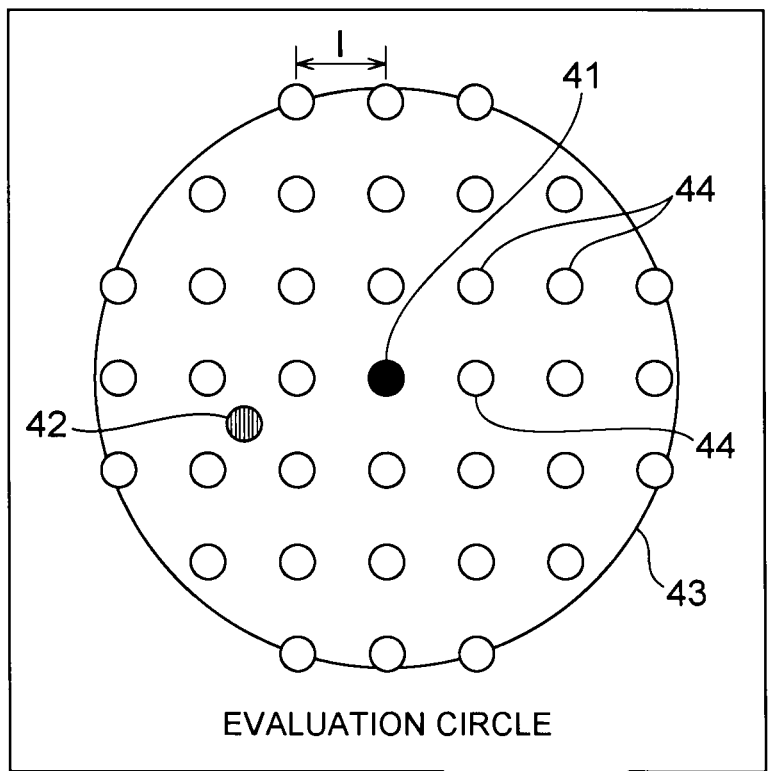
FIG. 2 is a drawing to illustrate a procedure of estimation of reception intensity.
Figure 2:
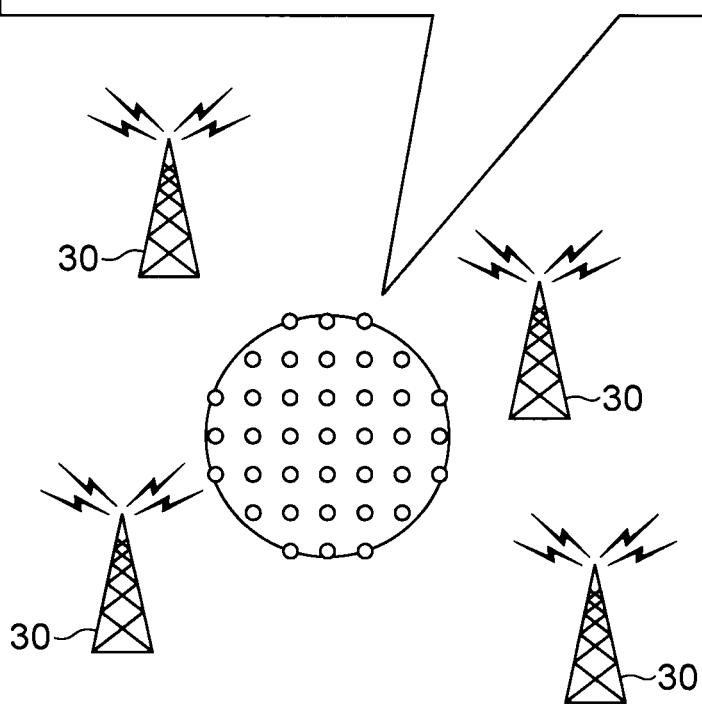

The reception intensity estimating unit 14 is a reception intensity estimating unit that estimates the reception intensity of the radio wave from the base station 30 indicated by the reception information received by the reception information acquiring unit 12, according to the location indicated by the location information acquired by the location information acquiring unit 13. The reception intensity of the radio wave estimated by the reception intensity estimating unit 14 is a theoretical value of the reception intensity of the radio wave according to the location indicated by the location information. FIG. 2 shows the location 41 indicated by the location information acquired by the location information acquiring unit 13. However, since the location 41 indicated by the location information acquired by the location information acquiring unit 13 is (or can be) the approximate location as described above, it might be different from a location 42 where the mobile communication terminal 20 is actually located. When the above is taken into consideration, the reception intensity estimated by the reception intensity estimating unit 14, preferably, is not (the theoretical value of) the reception intensity of the radio wave at the location indicated by the location information, but is a value representative of an area including surroundings of the location indicated by the location information. From this point of view, the reception intensity estimating unit 14 estimates the reception intensity of the radio wave, specifically, as described below.

The reception intensity estimating unit 14 sets a predetermined range based on the location indicated by the location information. For example, as shown in FIG. 2, the reception intensity estimating unit 14 sets as the predetermined range a range 43 of a circle with a predetermined radius (evaluation circle 43) centered on the location 41 indicated by the location information. The radius of the evaluation circle 43 is determined, for example, to be a value preliminarily set with consideration to the above and stored in the reception intensity estimating unit 14 (e.g., 100 m or the like). This value may be defined as one according to a communication area of the base station 30 or a method of estimating the location information acquired by the location information acquiring unit 13. Namely, the aforementioned predetermined range may be determined according to the communication area of the base station 30 or the estimation method of the location associated with the location information.

Specifically, the value of the radius of the evaluation circle 43 may be determined to be a value of a cell radius of a base station 30 with the highest reception intensity indicated by the reception information, among the base stations 30 indicated by the reception information. The cell radius is a communication area covered by each base station 30 and is determined for each base station 30, based on the radio wave intensity of base station 30, installation intervals of base stations 30, and so on. When the evaluation circle 43 is determined as described above, information indicative of the value of the cell radius of each base station 30 is preliminarily stored in the estimation database 11 and the reception intensity estimating unit 14 refers to the values to determine the evaluation circle 43. It is also possible to adopt as the value of the radius of the evaluation circle 43, an average value of all cell radii of base stations 30 in a region of interest or an average value of cell radii of the base stations 30 indicated by the reception information. The reason for the above is that the accuracy of the location estimated by the location information acquiring unit 13 is considered to become worse with increase in the cell radius.

Furthermore, the value of the radius of the evaluation circle 43 may be determined to be 500 m in the case where the estimation of the location information is to estimate the terminal location as the location of the base station 30, or to be 200 m or the like in the case where the estimation of the location information is to estimate the terminal location as the center location of the sector (on the assumption that the reception intensity estimating unit 14 preliminarily stores the estimation methods and values of radius of evaluation circle 43 in association with each other). Namely, the value of the radius is set smaller as the accuracy of the positioning method becomes higher. In that case, the location information acquiring unit 13 outputs information indicative of the estimation method of the location information to the reception intensity estimating unit 14 and the value of the radius of the evaluation circle 43 is determined based on the information. If the estimation of the location is carried out at the mobile communication terminal 20, the mobile communication terminal 20 transmits the information indicative of the estimation method of the location information, together with the location information, to the location information acquiring unit 13 of the building influence estimation apparatus 10. The reason for the above is that the accuracy of the location estimated by the location information acquiring unit 13 is considered to be that according to the estimation method of the location information.

Subsequently, the reception intensity estimating unit 14 sets evaluation points 44 (coordinates) at a plurality of locations in the evaluation circle 43. The evaluation points 44, for example as shown in FIG. 2, are equally-spaced locations in prescribed directions (e.g., the south-north direction and east-west direction) based on the location 41 indicated by the location information acquired by the location information acquiring unit 13. An interval I between evaluation points 44 can be determined, for example, to be a value (system parameter) preliminarily set and stored in the reception intensity estimating unit 14, or a value calculated from the value of the radius of the evaluation circle 43. For example, it is calculated based on the equation of evaluation point interval I=radius of evaluation circle/n (where n is a value (system parameter) stored in the reception intensity estimating unit 14, e.g., 10 or the like). The evaluation points 44 may include the location 41 indicated by the location information.

A more accurate method to set the evaluation points than the above method is the following method. First, the location information acquiring unit 13 preliminarily stores reception intensities of radio waves received by the mobile communication terminal from transmitters according to locations. Specifically, an area covered by all base stations 30 is gridized in advance, and electric field intensities of radio signals from all the base stations 30 are estimated in each grid (with the mobile communication terminal 20 being in the grid). The gridization may be carried out by a method as described below. The estimation of electric field intensities needs to be carried out in consideration of elements such as distances from the base stations 30, geography and topographical features of the grid, the shape of the building, materials of the building, and so on. The estimated signal intensities of all the base stations in the respective grids thus estimated are recorded in a database.

This database has a structure storing location coordinates of the respective grids, identifiers of all the base stations in each of the grids, estimated electric field intensities of signals from the respective base stations, and so on. This database may be recorded in the aforementioned estimation database 11. This database is preliminarily prepared by measurement or by computer simulation or the like by an administrator or the like of the network. This database may be the same as a database used in a positioning system to estimate the location of mobile communication terminal 20 normally by making use of database collation.

Subsequently, the location information acquiring unit 13 makes a comparison between the reception information associated with the reception information acquired by the reception information acquiring unit 12, and the stored reception intensities and acquires the location information, based on the result of the comparison. Specifically, the location information acquiring unit 13 compares the signal intensity (reception intensity) of the radio wave transmitted and received between the mobile communication terminal 20 and the base station 30, which was measured and acquired by the mobile communication terminal 20, with the estimated signal field intensities recorded in the database and selects a grid with a highest degree of coincidence with the measured signal intensity by calculation. A method to calculate the degree of coincidence may be, for example, a method of determining Euclidean distances between the data measured by the mobile communication terminal 20 and the estimated signal field intensities recorded in the database and defining a grid with a smaller Euclidean distance as a grid having a higher degree of coincidence. How to calculate an Euclidean distance is as follows: for each base station 30 measured at the mobile communication terminal 20, a difference is calculated between the measured signal intensity and the estimated signal field intensity of the same base station 30 recorded in the database, and a square root of a sum of squares of respective differences for all the base stations 30 measured at the mobile communication terminal 20 is defined as the Euclidean distance. The location information acquiring unit 13 sets as the location information, location coordinates of the grid with the highest degree of coincidence calculated (e.g., a center point of the grid).

Figure 6:
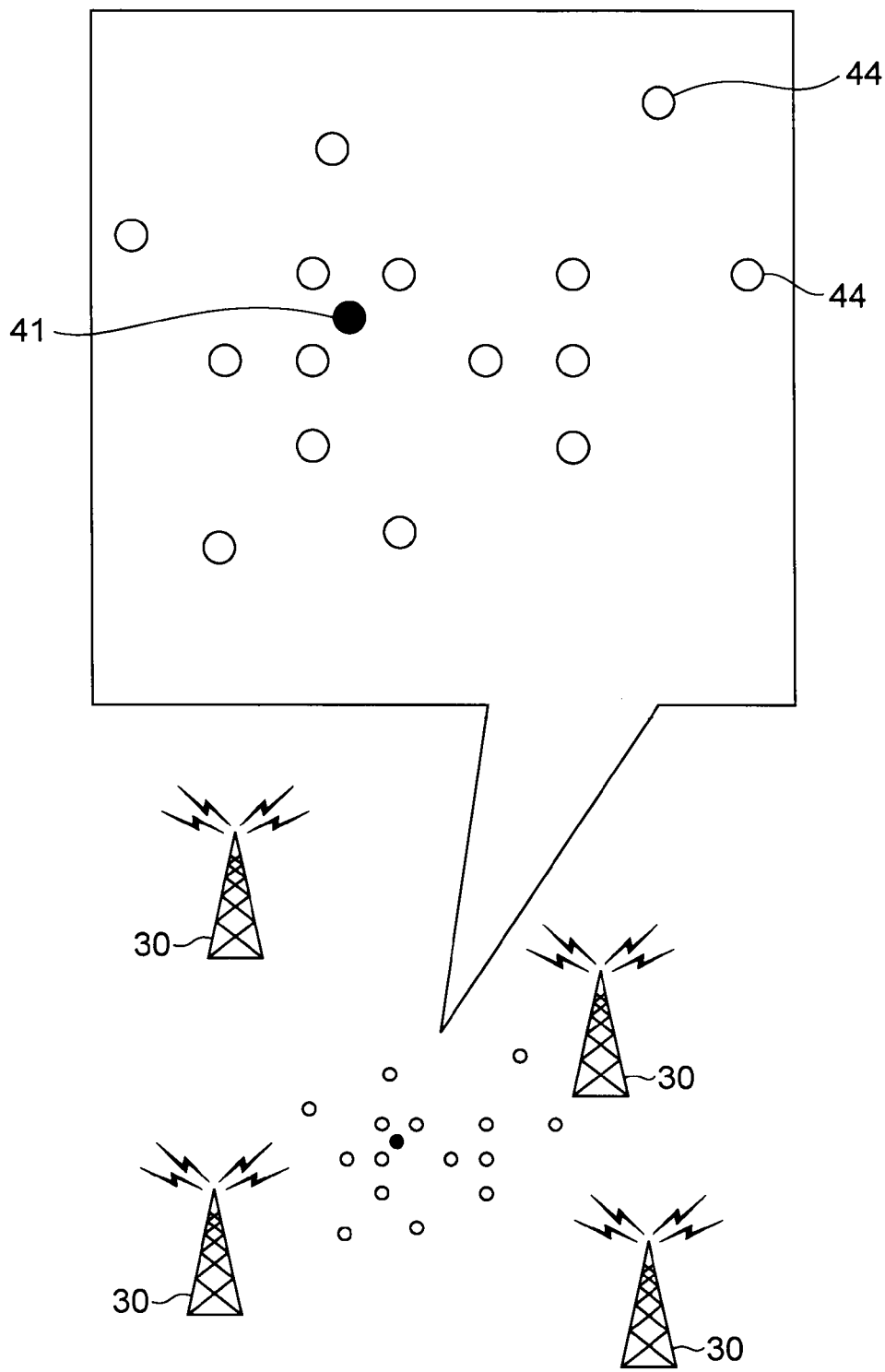
FIG. 6 is another drawing to illustrate the procedure of estimation of reception intensity.

It is, however, noted that the foregoing location information calculated in the location information acquiring unit 13 does not have to be information associated with one location. In this case, for example, degrees of coincidence are calculated for the respective grids in the database and location coordinates of n grids with highest degrees of coincidence are set as the location information. The number n may be a parameter preliminarily set by the network administrator or the like, e.g., n=10 or the like. When the foregoing locations are set as the location information, as shown in FIG. 6, those locations may be used as the aforementioned evaluation points 44. The information indicative of the evaluation points 44 is fed from the location information acquiring unit 13 to the reception intensity estimating unit 14. The reception intensity estimating unit 14 handles the evaluation points 44 fed from the location information acquiring unit 13, as described below, to estimate the reception intensity of the radio wave according to the location indicated by the location information.

Furthermore, as shown in FIG. 6, if the location information acquiring unit 13 can acquire the location 41 indicated by the location information, by the method as described above (except for the method of comparison with the stored reception intensities as described above), it sets a predetermined range based on the location 41. It may be configured to calculate degrees of coincidence described above, only within the set range and to carry out the setting of evaluation points 44. In this case, the setting of the range may be carried out, for example, by the same method as the aforementioned range setting method.

Subsequently, the reception intensity estimating unit 14 calculates (a theoretical value of) the reception intensity of the radio wave from the base station 30 indicated by the reception information, at each evaluation point 44. The theoretical value calculated herein is calculated on the assumption that the mobile communication terminal 20 is located outside a building (=outdoors) at that point. The reception intensity estimating unit 14 calculates a distance between each base station 30 and the evaluation point 44, with reference to the information indicative of the location of each base station 30 stored in the estimation database 11. Next, it calculates the reception intensity from the distance and the transmission intensity of the radio wave of each base station 30 stored in the estimation database 11. This calculation is carried out, for example, using the Okumura-Hata, et al. radio wave propagation model (e.g., cf. "M. Hata, "Empirical formula for propagation loss in land mobile radio services," IEEE Trans. Veh. Technol., VT-29, No. 3, pp. 317-325, August 1980"). The parameters in the radio wave propagation model are those preliminarily tuned and stored in the reception intensity estimating unit 14. The reception intensity estimating unit 14 calculates the reception intensity, for each base station 30 indicated by the reception information and for each evaluation point 44.

The reception intensity estimating unit 14 calculates a statistical value of reception intensities at the respective evaluation points 44 for each base station 30 (e.g., a mean value or median value of reception intensities at all the evaluation points 44). The reception intensity estimating unit 14 may define the statistical values for the respective base stations 30 calculated in this manner, as the reception intensity of the radio wave according to the location indicated by the location information. Furthermore, the reception intensity estimating unit 14 calculates a further statistical value of the statistical values of the respective base stations 30 (e.g., a mean value or median value of reception intensities for all the base stations 30). The reception intensity estimating unit 14 may define one statistical value calculated in this manner, as the reception intensity of the radio wave according to the location indicated by the location information. When the reception intensity is one value as in this case, the reception intensity of the reception information acquired by the reception information acquiring unit 12 shall also be one value. In that case, the reception information acquiring unit 12 calculates a statistical value of values of reception intensities corresponding to the respective base stations 30 in the reception information (e.g., a mean value or median value of reception intensities for all the base stations 30) and defines the statistical value as a value of the reception intensity associated with the reception information. The reception intensity estimating unit 14 outputs the estimated reception intensity of the radio wave according to the location indicated by the location information, to the comparing unit 15.

The estimation of the reception intensity by the reception intensity estimating unit 14 does not always have to be carried out by calculation for each procedure (of the estimation of influence of building) as described above, but may be carried out in such a manner that reception intensities of radio waves from respective base stations 30 according to locations are preliminarily calculated and stored in the reception intensity estimating unit 14 and the estimation is carried out based on the stored information. Specifically, for example, a service area (area where the mobile communication terminal 20 can perform mobile communication; a calculation object may be each of areas obtained by segmenting the service area into areas) is first segmented into grids in a size of n×m. Here n×m is a preset parameter and is, for example, a size of 150 m×200 m or the like. A center point of each grid is defined as a (predetermined) evaluation point and the reception intensity of the radio wave from each base station 30 at the evaluation point is calculated in the same manner as above. On this occasion, the base stations 30 as calculation objects are all the base stations 30 included in the service area. The base stations 30 as calculation objects may be all base stations 30 within a range of a certain distance (e.g., 1000 m or the like) from the evaluation point.

The information of reception intensities of radio waves for respective base stations 30 at respective evaluation points calculated as described above is stored in (the estimation database 11 or the like of) the building influence estimation apparatus 10. Specifically, an identifier to identify each evaluation point, a location of the evaluation point, and the value of the reception intensity of the radio wave for each base station 30 are stored in association with each other. The reception intensity estimating unit 14 reads the information of the reception intensities of the radio waves for the respective base stations 30 at the evaluation points included in the determined evaluation circle 43 and estimates the reception intensity according to the location indicated by the location information, in the same manner as above.

The comparing unit 15 is a comparing unit that makes a comparison between the value of the reception intensity estimated by the reception intensity estimating unit 14 (estimated reception intensity) and the value of the reception intensity of the radio wave (actually measured reception intensity) indicated by the reception information received by the reception information acquiring unit 12. Specifically, the comparing unit 15 subtracts the measured reception intensity from the estimated reception intensity to obtain a difference, thereby to compare them. Since the estimated reception intensity and the measured reception intensity fed into the comparing unit 15 correspond to each other (e.g., the estimated reception intensity and the measured reception intensity both are single values, or the estimated reception intensity and the measured reception intensity both are values for the respective base stations 30), the subtraction is performed between their respective corresponding values. Therefore, the result of the subtraction is obtained by the same number as the number of estimated reception intensity and measured reception intensity fed into the comparing unit 15. The comparing unit 15 outputs the value obtained by the above operation, to the building influence estimating unit 16.

The building influence estimating unit 16 is a building influence estimating unit that estimates the influence of the building on the mobile communication terminal 20, based on the result of the comparison by the comparing unit 15. The estimated influence of the building is whether the mobile communication terminal 20 is located inside the building, or the building entry loss of the radio wave reaching the mobile communication terminal 20 from the base station 30 as described above. Specifically, the building influence estimating unit 16 multiplies the difference between the estimated reception intensity and the measured reception intensity fed from the comparing unit 15, by a coefficient to estimate (an index value indicative of) the building entry loss of the radio wave. The foregoing coefficient is a system parameter preliminarily stored in the building influence estimating unit 16. This value indicative of the building entry loss of the radio wave is a single value in the case using the statistical value of reception intensities for all the base stations 30, or values for the respective base stations 30 in the case using the differences of the reception intensities for the respective base stations 30. The building influence estimating unit 16 may be configured to determine whether the foregoing value indicative of the building entry loss of the radio wave is not less than a threshold, thereby to determine whether the mobile communication terminal 20 is located inside the building. If the building entry loss of the radio wave is not less than the threshold, the mobile communication terminal 20 is determined to be located inside the building. The foregoing threshold is preliminarily set as an appropriate value based on a test or the like, and stored in the building influence estimating unit 16.

In the case where the differences of reception intensities for the respective base stations 30 are obtained, the building influence estimating unit 16 may calculate the building entry loss of the radio wave as described below. If the number of base stations 30 for which the difference of reception intensity is not less than a threshold p is not less than a threshold q, a statistical value (e.g., a mean value or the like) of the differences not less than the threshold p is defined as (an index value indicative of) the building entry loss. The building influence estimating unit 16 outputs the information indicative of the estimated influence of the building (information indicating the value of the building entry loss or indicating whether the mobile communication terminal 20 is located inside the building), to the outputting unit 17.

The outputting unit 17 is an outputting unit that outputs the information indicative of the influence of the building estimated by the building influence estimating unit 16. For example, the outputting unit 17 performs the output by indicating the information indicative of the influence of the building on a display device of the building influence estimation apparatus 10 so that the administrator or the like of the building influence estimation apparatus 10 can check the influence of the building. As another example, the outputting unit 17 may output the information indicative of the influence of the building to the mobile communication terminal 20 or to another device or module. In that case, the information is used, for example, as reference information for positioning of the mobile communication terminal 20.

Figure 3:
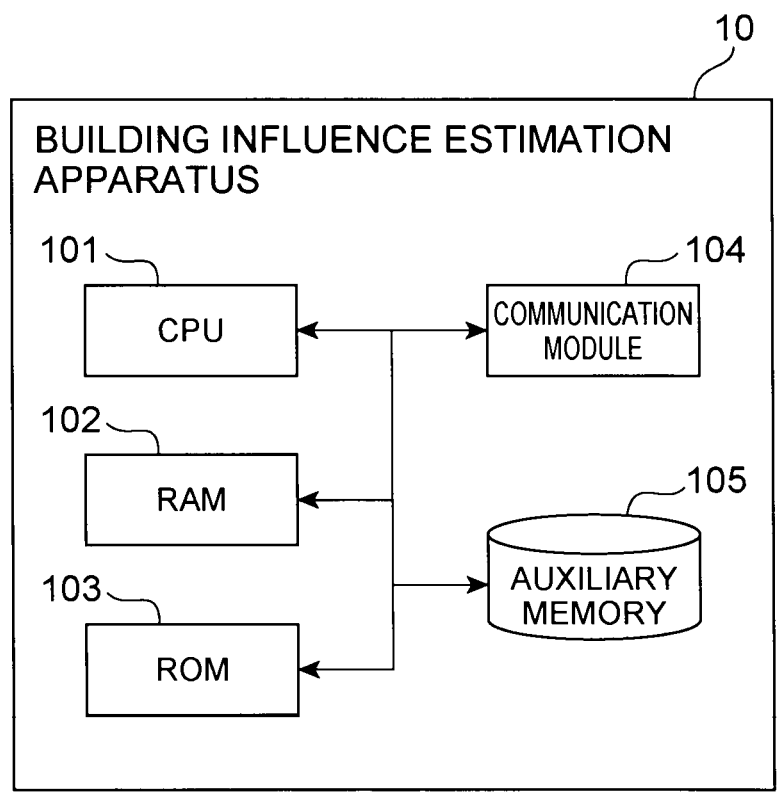
FIG. 3 is a drawing to show a hardware configuration of the building influence estimation apparatus according to the embodiment of the present invention.

FIG. 3 shows a hardware configuration of the building influence estimation apparatus 10. As shown in FIG. 3, the building influence estimation apparatus 10 is configured as a device including a computer equipped with such hardware as a CPU 101, RAM (Random Access Memory) 102 and ROM (Read Only Memory) 103 as primary storage devices, a communication module 104 for execution of communication, and an auxiliary storage device 105 such as a hard disk. These constituent elements operate according to a program or the like to exercise the aforementioned functions of the building influence estimation apparatus 10.

Figure 4:
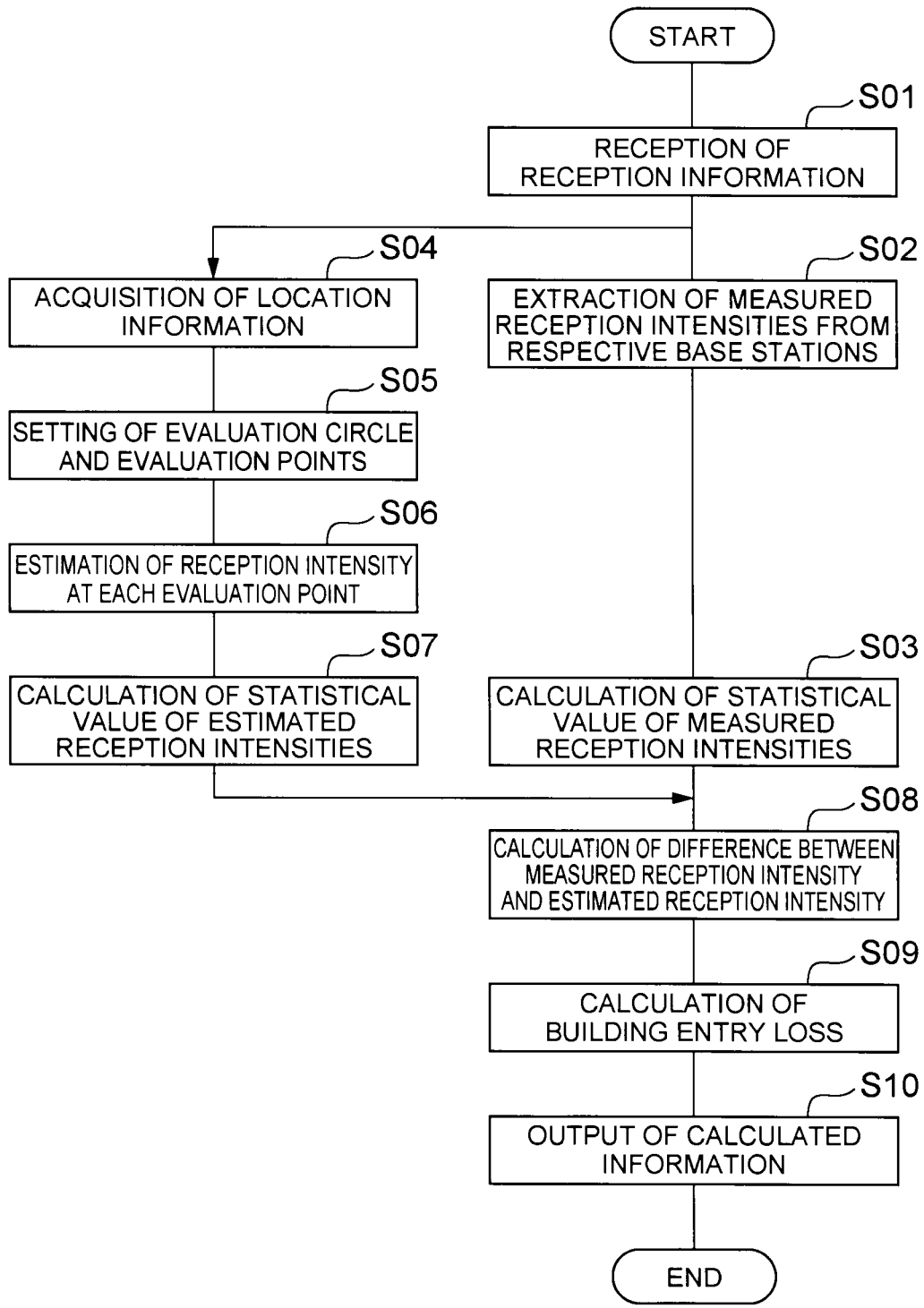
FIG. 4 is a flowchart to show a procedure (building influence estimation method) executed in the building influence estimation apparatus according to the embodiment of the present invention.
Figure 5:
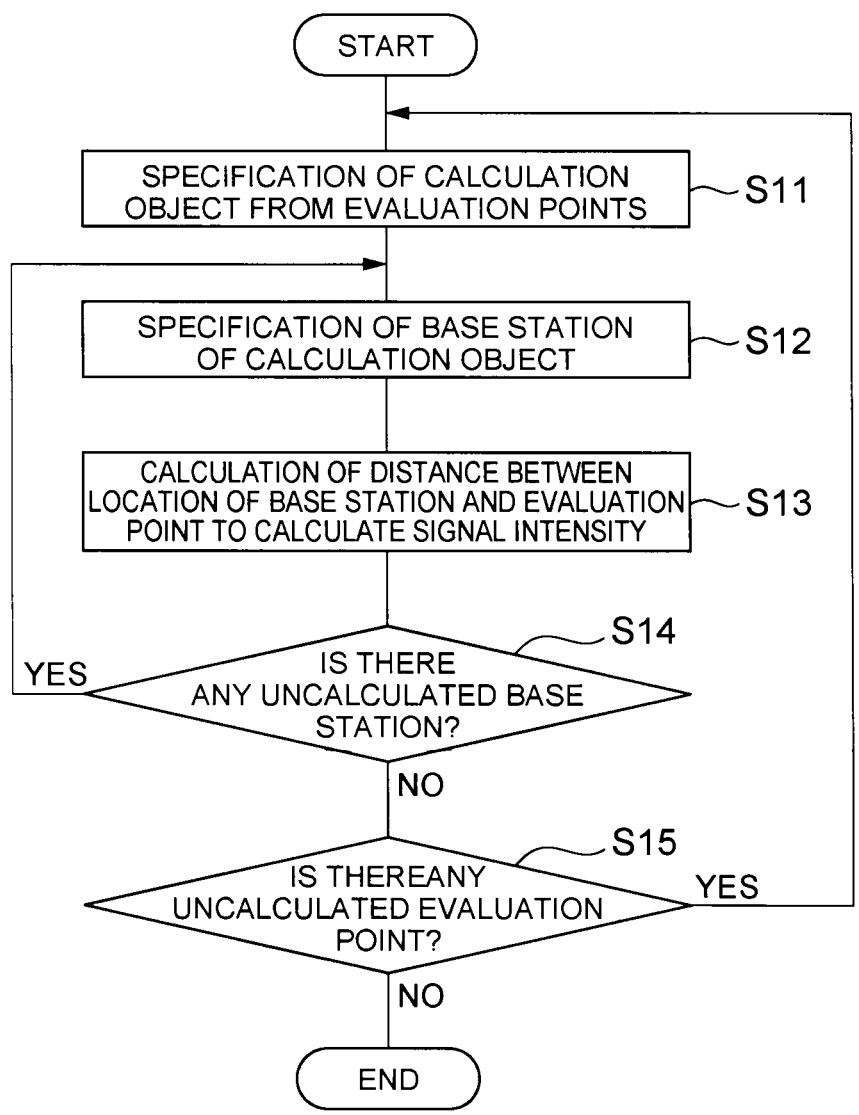
FIG. 5 is a flowchart to show a part (estimation of reception intensity) of the procedure (building influence estimation method) executed in the building influence estimation apparatus according to the embodiment of the present invention.

The following will describe the procedure (building influence estimation method) executed in the building influence estimation apparatus 10 of the present embodiment, using the flowcharts of FIGS. 4 and 5.

First, the mobile communication terminal 20 receives radio waves from respective base stations 30 and transmits the reception information indicative of the reception intensities (signal intensities) of the received radio waves and indicative of the base stations 30 to the building influence estimation apparatus 10. The reception of radio waves and the transmission of reception information may be carried out spontaneously from the mobile communication terminal 20 side or in accordance with a request from the building influence estimation apparatus 10. In the building influence estimation apparatus 10, the reception information acquiring unit 12 receives the reception information (S01, reception information acquiring step). The information indicative of the base stations 30 included in the reception information is output from the reception information acquiring unit 12 to the reception intensity estimating unit 14.

Next, the reception information acquiring unit 12 extracts the information indicative of the reception intensities from the respective base stations 30, from the reception information (S02, reception information acquiring step). Thereafter, the reception information acquiring unit 12 calculates a statistical value of the reception intensities used for the comparison by the comparing unit 15 and defines the statistical value as a value of the reception intensity associated with the reception information (S03, reception information acquiring step). The value of the reception intensity associated with the reception information is output from the reception information acquiring unit 12 to the comparing unit 15.

On the other hand, after the reception of the reception information by the reception information acquiring unit 12, the location information acquiring unit 13 acquires the location information indicative of the location where the mobile communication terminal 20 received the radio waves (S04, location information acquiring step). The acquisition of the location information is performed, for example, by supplying the reception information from the reception information acquiring unit 12 to the location information acquiring unit 13 and calculating the location from the reception information. Alternatively, it may be acquired by receiving the location information from the mobile communication terminal 20 (in that case, the acquisition of the location information does not always have to be carried out after the reception of the reception information by the reception information acquiring unit 12). The acquired location information is output from the location information acquiring unit 13 to the reception intensity estimating unit 14.

Subsequently, the reception intensity estimating unit 14 estimates the reception intensities of the radio waves from the base stations 30 indicated by the reception information, according to the location indicated by the location information, as described below. First, the evaluation circle 43 centered on the location 41 indicated by the location information is set. Furthermore, a plurality of evaluation points 44 are set in the evaluation circle 43 (S05, reception intensity estimating step). Thereafter, the reception intensity estimating unit 14 estimates the reception intensities of the radio waves from the base stations 30 indicated by the reception information, at each evaluation point 44 (S05, reception intensity estimating step).

The estimation of reception intensities is carried out, for example, as shown in the flowchart of FIG. 5. First, one of the evaluation points 44 set is selected as a calculation object (S11, reception intensity estimating step). Then one of the base stations 30 indicated by the reception information is selected as a calculation object (S12, reception intensity estimating step). Next, a distance between the evaluation point 44 and the base station 30 of the calculation objects is calculated and the reception intensity of the radio wave from the base station 30 at the evaluation point 44 is calculated based on the distance (S13, reception intensity estimating step). Subsequently, it is determined whether there is any base station 30 for which the reception intensity at the evaluation point 44 is not calculated, among the base stations 30 indicated by the reception information (S14, reception intensity estimating step). When it is determined that there are uncalculated base stations 30, one of the uncalculated base stations 30 is selected as a calculation object and the reception intensity is calculated again in the same manner as above (S12 and S13). Thereafter, it is determined whether there is any base station 30 for which the reception intensity at the evaluation point 44 is not calculated, in the same manner as above (S14).

When it is determined that there is no uncalculated base station 30, it is determined whether there is any evaluation point 44 for which the reception intensity is not calculated, among the evaluation points 44 (S15, reception intensity estimating step). When it is determined that there are uncalculated evaluation points 44, one of the uncalculated evaluation points 44 is selected as a calculation object and the reception intensity is calculated again in the same manner as above (S11-S15). When it is determined that there is no uncalculated evaluation point 44, the process of calculation of reception intensities is terminated. This process results in calculating values of the reception intensities of the radio waves from the respective base stations 30 at the respective evaluation points 44.

The reception intensities of the radio waves from the respective base stations 30 at the respective evaluation points 44 may be determined by preliminarily calculating the reception intensities of the radio waves from the respective base stations 30 in respective grids, storing them in the reception intensity estimating unit 14, and using them as the reception intensities as described above.

Subsequently, as shown in FIG. 4, the reception intensity estimating unit 14 calculates a statistical value of the reception intensities calculated (or estimated) as described above, which is used in the comparison by the comparing unit 15 (S07, reception intensity estimating step). The statistical value herein is the statistical values for the respective base stations 30 (in this case, the statistical values are calculated by the number of base stations 30), or the statistical value of all the base stations 30 (in this case, only one statistical value is calculated) as described above. The statistical value calculated is output from the reception intensity estimating unit 14 to the comparing unit 15.

Next, the comparing unit 15 makes a comparison between the value of the reception intensity estimated by the reception intensity estimating unit 14 (estimated reception intensity) and the value of the reception intensity of the radio wave (measured reception intensity) indicated by the reception information received by the reception information acquiring unit 12 (S08, comparing step). Specifically, the measured reception intensity is subtracted from the estimated reception intensity to obtain a difference. Next, the value obtained by the above operation is output from the comparing unit 15 to the building influence estimating unit 16.

Then the building influence estimating unit 16 estimates the influence of the building on the mobile communication terminal 20, based on the numerical value indicative of the result of the comparison by the comparing unit 15 (S09, building influence estimating step). Specifically, the difference fed from the comparing unit 15 is multiplied by a coefficient to calculate the building entry loss of the radio wave. The calculated building entry loss is compared with the threshold to determine whether the mobile communication terminal 20 is located inside the building. The information indicative of the estimated influence of the building (information indicative of a value of the building entry loss, or whether the mobile communication terminal 20 is located inside the building) is output from the building influence estimating unit 16 to the outputting unit 17.

Next, the outputting unit 17 outputs the information indicative of the influence of the building estimated by the building influence estimating unit 16 (S10, outputting step).

In the present embodiment, as described above, the influence of the building on the mobile communication terminal 20 is estimated based on the comparison between the measured reception intensity and the estimated (or calculated) reception intensity of the radio wave from the base station 30 at the location of the mobile communication terminal 20. Therefore, the influence of the building on the mobile communication terminal 20 normally used by a user can be estimated without need for the special devices for transmission and reception of radio waves. Furthermore, there is no need for the information about the building such as the shape of the building and for complicated calculation. Namely, the present embodiment enables the apparatus to achieve the appropriate and easy estimation of the influence of the building on the mobile communication terminal 20.

It is preferable to estimate the reception intensities of radio waves from base stations 30 at a plurality of evaluation points 44 (locations) in the predetermined range such as the evaluation circle 43 based on the location indicated by the location information and to estimate the reception intensity of the radio wave according to the location indicated by the location information, from the reception intensities at the evaluation points 44 as described above. Namely, the estimated reception intensity of radio wave comes to reflect the reception intensities in the entire predetermined range. Even in the case where the accuracy of the location associated with the location information is not so high and there is a deviation from the actual location of the mobile communication terminal 20, the actual location of the mobile communication terminal 20 can be included in the predetermined range. Therefore, the influence of the building can be estimated more appropriately even in the case where the accuracy of the location associated with the location information is not high. However, in the case where the accuracy of the location indicated by the location information is considered to be high, the reception intensity of the radio wave according to the location indicated by the location information can be determined to be the reception intensity at the location indicated by the location information (instead of the predetermined range).

It is also desirable to define (the area of) the aforementioned predetermined range as one according to the communication area of the base station 30 or the estimation method of the location associated with the location information, as described above. This configuration allows the range for the estimation of the reception intensity to be set in an appropriate area according to the accuracy of the location indicated by the location information, so that the influence of the building can be estimated appropriately. However, the predetermined range may be a fixed area.

As described above, each of the measured value and the estimated value (calculated value) of reception intensity may be one value like a statistical value of all base stations 30 or may be values for respective base stations 30. These configurations allow the influence of the building to be estimated securely.

It is desirable to estimate the location from the reception information and to acquire the location information as in the present embodiment. According to this configuration, the building influence estimation apparatus needs just to acquire at least the reception information (from outside) on the occasion of estimating the influence of the building. It is also feasible to securely acquire the location information associated with the location where the radio wave was received.

It is also preferable to calculate the radio wave intensity associated with the reception information from the reception intensities of radio waves received at a plurality of different times by the mobile communication terminal 20, as described above. It is usually the case that the reception intensities of radio waves received by the mobile communication terminal 20 vary because of fading or the like, but this configuration can eliminate the variation and, as a result, enables appropriate estimation of influence of the building.

In the present embodiment, as described above, the subjective body to carry out the procedure of estimation of influence of the building was the building influence estimation apparatus 10, but the subjective body to carry out the procedure may be the mobile communication terminal 20. In that case, specifically, the mobile communication terminal 20 may be configured with all the functions of the present invention. In that case, the information necessary for the procedure of estimation or the like is preliminarily transmitted to the mobile communication terminal 20.

The radio wave transmitters do not always have to be the base stations 30 as in the present embodiment, but they may be any sources that transmit radio waves to be received by the mobile communication terminal 20.

What is claimed is:

1. A building influence estimation apparatus for estimating influence of a building on a mobile communication terminal, comprising:

reception information acquiring unit which acquires reception information indicative of a measured reception intensity of a radio wave received by the mobile communication terminal from at least one radio wave transmitter and indicative of the transmitter;

location information acquiring unit which acquires location information indicative of a location where the mobile communication terminal received the radio wave;

reception intensity estimating unit which performs an estimation and generates an estimated reception intensity of a radio wave from the transmitter indicated by the reception information received by the reception information acquiring unit, according to the location indicated by the location information acquired by the location information acquiring unit;

comparing unit which makes a comparison between the estimated reception intensity estimated by the reception intensity estimating unit and the measured reception intensity of the radio wave indicated by the reception information acquired by the reception information acquiring unit;

building influence estimating unit which estimates an influence of the building on the mobile communication terminal, based on a result of the comparison by the comparing unit; and outputting unit which outputs information indicative of the influence of the building estimated by the building influence estimating unit, wherein the reception intensity estimating unit generates estimated reception intensities of radio waves from the transmitter for a plurality of locations in a predetermined range based on the location indicated by the location information, and generates the estimated reception intensity of the radio wave according to the location indicated by the location information, from the estimated reception intensities for the plurality of locations, wherein the reception intensity estimating unit calculates statistical values for respective transmitters from measured reception intensities of radio waves from the transmitters at the plurality of locations and defines the statistical values as estimated reception intensities of the radio waves according to the location indicated by the location information, and wherein the comparing unit makes a comparison between each of the estimated reception intensities of the respective transmitters estimated by the reception intensity estimating unit and the measured reception intensity of the radio wave indicated by the information received by the reception information acquiring unit.

2. The building influence estimation apparatus according to claim 1, wherein the reception intensity estimating unit defines the predetermined range as a range according to a communication area of the transmitter or an estimation method of the location.

3. The building influence estimation apparatus according to claim 1, wherein the reception information acquiring unit acquires information indicative of measured reception intensities of radio waves received at a plurality of different times by the mobile communication terminal and indicative of the transmitter, and calculates the reception information from the information associated with the plurality of different times.

4. The building influence estimation apparatus according to claim 1, wherein the building influence estimating unit estimates as the influence of the building, at least either of whether the mobile communication terminal is present in the building, and a building entry loss of the radio wave from the transmitter received by the mobile communication terminal.

5. A building influence estimation apparatus for estimating influence of a building on a mobile communication terminal, comprising:

reception information acquiring unit which acquires reception information indicative of a measured reception intensity of a radio wave received by the mobile communication terminal from at least one radio wave transmitter and indicative of the transmitter;

location information acquiring unit which acquires location information indicative of a location where the mobile communication terminal received the radio wave;

reception intensity estimating unit which performs an estimation and generates an estimated reception intensity of a radio wave from the transmitter indicated by the reception information received by the reception information acquiring unit, according to the location indicated by the location information acquired by the location information acquiring unit;

comparing unit which makes a comparison between the estimated reception intensity estimated by the reception intensity estimating unit and the measured reception intensity of the radio wave indicated by the reception information acquired by the reception information acquiring unit;

building influence estimating unit which estimates an influence of the building on the mobile communication terminal, based on a result of the comparison by the comparing unit; and outputting unit which outputs information indicative of the influence of the building estimated by the building influence estimating unit, wherein the location information acquiring unit acquires the location information by estimating the location, based on the measured reception information acquired by the reception information acquiring unit, wherein the location information acquiring unit preliminarily stores measured reception intensities of radio waves received by the mobile communication terminal from the transmitter, according to locations, makes a comparison between the measured reception intensity associated with the reception information acquired by the reception information acquiring unit, and the stored measured reception intensities, and acquires the location information, based on a result of the comparison, and wherein the reception intensity estimating unit generates estimated reception intensities of the radio waves from the transmitter for a plurality of locations based on the location indicated by the location information, and generates the estimated reception intensity of the radio wave according to the location indicated by the location information, from the estimated reception intensities for the plurality of locations.

6. A building influence estimation method for estimating influence of a building on a mobile communication terminal, comprising:

a reception information acquiring step of acquiring reception information indicative of a measured reception intensity of a radio wave received by the mobile communication terminal from at least one radio wave transmitter, and indicative of the transmitter;
a location information acquiring step of acquiring location information indicative of a location where the mobile communication terminal received the radio wave;
a reception intensity estimating step of performing an estimation and generating an estimated reception intensity of the radio wave from the transmitter indicated by the reception information received in the reception information acquiring step, according to the location indicated by the location information acquired in the location information acquiring step;
a comparing step of making a comparison between the estimated reception intensity estimated in the reception intensity estimating step and the measured reception intensity of the radio wave indicated by the reception information acquired in the reception information acquiring step;
a building influence estimating step of estimating an influence of the building on the mobile communication terminal, based on a result of the comparison in the comparing step; and
an outputting step of outputting information indicative of the influence of the building estimated in the building influence estimating step,
wherein the reception intensity estimating step further comprises generating estimated reception intensities of radio waves from the transmitter for a plurality of locations in a predetermined range based on the location indicated by the location information, and generating the estimated reception intensity of the radio wave according to the location indicated by the location information, from the estimated reception intensities for the plurality of locations,
wherein the reception intensity estimating step further comprises calculating statistical values for respective transmitters from measured reception intensities of radio waves from the transmitters at the plurality of locations and defining the statistical values as estimated reception intensities of the radio waves according to the location indicated by the location information, and
wherein the comparing step further comprises making a comparison between each of the estimated reception intensities of the respective transmitters estimated by the reception intensity estimating step and the measured reception intensity of the radio wave indicated by the information received by the reception information acquiring step.

7. A building influence estimation method for estimating influence of a building on a mobile communication terminal, comprising:

a reception information acquiring step of acquiring reception information indicative of a measured reception intensity of a radio wave received by the mobile communication terminal from at least one radio wave transmitter, and indicative of the transmitter;
a location information acquiring step of acquiring location information indicative of a location where the mobile communication terminal received the radio wave;
a reception intensity estimating step of performing an estimation and generating an estimated reception intensity of the radio wave from the transmitter indicated by the reception information received in the reception information acquiring step, according to the location indicated by the location information acquired in the location information acquiring step;
a comparing step of making a comparison between the estimated reception intensity estimated in the reception intensity estimating step and the measured reception intensity of the radio wave indicated by the reception information acquired in the reception information acquiring step;
a building influence estimating step of estimating an influence of the building on the mobile communication terminal, based on a result of the comparison in the comparing step; and
an outputting step of outputting information indicative of the influence of the building estimated in the building influence estimating step,
wherein the location information acquiring step further comprises acquiring the location information by estimating the location, based on the measured reception information acquired by the reception information acquiring step,
wherein the location information acquiring step further comprises preliminarily storing measured reception intensities of radio waves received by the mobile communication terminal from the transmitter, according to locations, making a comparison between the measured reception intensity associated with the reception information acquired by the reception information acquiring step, and the stored measured reception intensities, and acquiring the location information, based on a result of the comparison, and
wherein the reception intensity estimating step further comprises generating estimated reception intensities of the radio waves from the transmitter for a plurality of locations based on the location indicated by the location information, and generating the estimated reception intensity of the radio wave according to the location indicated by the location information, from the estimated reception intensities for the plurality of locations.

* * * * *